O. PADDOCK.
Ice Cream Freezer.
No. 36,725. Patented Oct. 21, 1862.
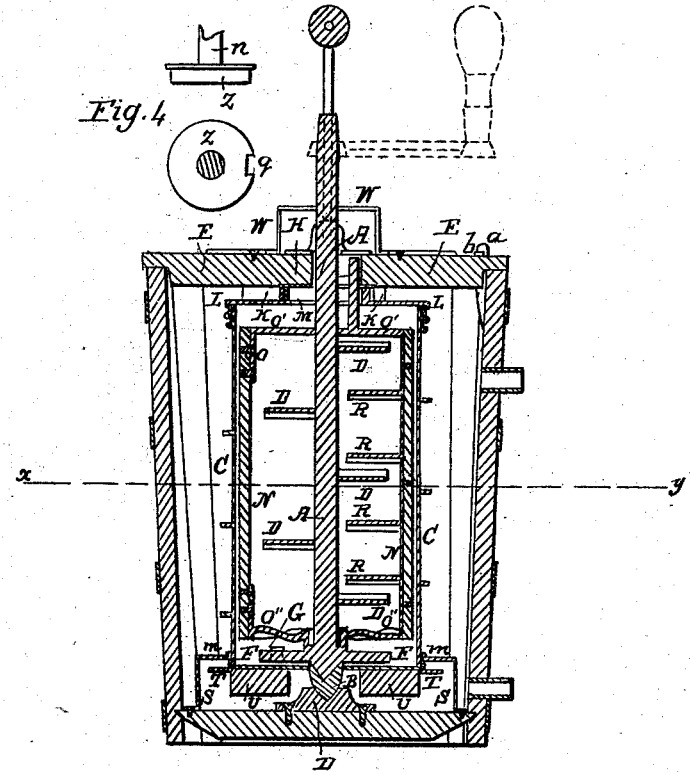
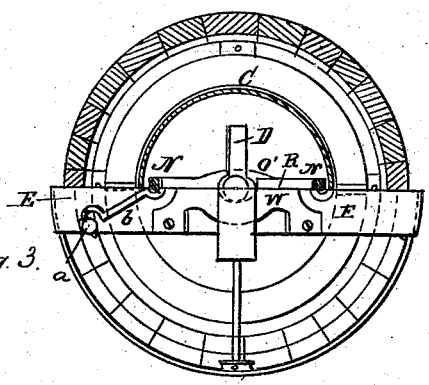

UNITED STATES PATENT OFFICE.

OSCAR PADDOCK, OF WATERTOWN, NEW YORK.

IMPROVED ICE-CREAM FREEZER.

Specification forming part of Letters Patent No. 36,725, dated October 21, 1862.

*To all whom it may concern:*

Be it known that I, OSCAR PADDOCK, of Watertown, in the county of Jefferson and State of New York, have invented certain new and useful Improvements in the Construction of Ice-Cream Freezers; and I hereby declare the following to be a full, clear, and exact description of the same.

My improvements relate to ice-cream freezers in which revolving freezing-vessels are used, in combination with stationary scraping-blades, and have for their object to remedy certain defects and inconveniences attending the practical use of freezers for which Letters Patent of the United States were granted to me on the 3d day of December, 1861; and my invention consists, first, in the employment, in combination with a spindle bearing in a socket in the bottom of the freezing-vessel, of a pivot cast to the said vessel, and bearing in a socket in the ice-bucket, the whole being arranged to operate substantially in the manner hereinafter set forth; second, in the employment of stirring-blades arranged to the bottom of the cream-holder, to mix with the ice particles and dissolve the salt that shall have been carried to the bottom, substantially as hereinafter set forth; third, in combining with a revolving cream-freezing vessel and stationary scrapers the use of revolving beaters fast on the spindle, operating in connection with stationary beaters fast on the scraper, substantially in the manner and for the purpose hereinafter set forth.

To enable others skilled in the art to make and use my improvements, I shall now describe their construction and operation by referring to the accompanying drawings, in which—

Figure 1 is a sectional elevation of my improved ice-cream freezer; Fig. 2, a horizontal section of the same, the plane of section passing through the line $x\,y$, Fig. 1; Fig. 3, a top view, and Fig. 4 a view in plan and elevation, of a detail.

In the said drawings, A represents the spindle. It is here shown solid, and pivoted at its lower end with conical pivot fitting in recessed bearing B, in the bottom of freezing-vessel or cream-holder C. Its upper end is square-shanked and slightly tapering, for the convenient adjustment of a crank to impart the requisite motion to the spindle. To the spindle are attached dashers or beaters D, consisting of horizontal blades twisted or inclined at an angle of about forty-five degrees in relation to a horizontal line. The spindle is moreover furnished at its under end and above its pivot with one or two arms, F, extending laterally a distance to come in contact with the studs G, that project vertically from the bottom of the freezing-vessel, thereby, on rotary motion being imparted to the former, transmit the same movement to the latter.

The freezing-vessel is held in the ice-bucket concentrically with the spindle in the following manner: I use a wooden covering, or, preferably, simply a wooden brace, E, arranged on top of the bucket to extend diametrically from one side to the other, opposite. This brace or covering I secure onto the bucket by means of hooks *b*, that hook in with the eyes *a*, projecting from the inner side of the bucket out through corresponding orifices or side notches in the covering or brace E. This brace or covering has a central orifice, H, through which the upper end of the spindle passes, and by which it is there held in the center of the bucket. In the center of the bottom of the bucket there is a socket, I, in which a pivot cast onto the bottom of the freezing-vessel is centered and capable of rotary motion. This pivot, it will be perceived, is hollow, constituting at its interior the bearing-socket to the spindle A, before referred to. From this it will be readily understood that the spindle is held concentrically with the bucket at the bottom, through the medium of the freezing-vessel or cream-holder, and at the top by means of the covering or brace E.

The freezing-vessel is maintained in position by the spindle and the flange K, fast on the brace in the following manner: The freezing-vessel C, which may be of cylindrical or other convenient form, is provided with a covering, L, which may be removed whenever it is necessary to fill the vessel. This covering has in its center a large opening bordered by a vertical flange, M, which is fitted by another covering fast to the brace E, whose flange K snugly surrounds the flange M, yet so that the latter may freely revolve within the former. The cream-holder or freezing-vessel is there shown to be held in position on top by means of the flange K, and on the bottom by means of its own pivot B, which in its turn is maintained in the center of the bucket by the spindle, to which it serves as a socket and the socket I in the bottom of the ice-bucket.

In operating the freezer the cream or the cream compound is first put in the freezing-vessel, and before placing the covering L and the clamping covering-flange K the scrapers are inserted. Their functions and operation being well understood, I shall confine myself to the description of pecularities of construction and operation wherein those represented in the annexed drawings differ from those heretofore used. The scrapers N are wooden blades attached to a metallic frame, O. The latter consists of two cross bars, O' and O'', placed, respectively, on top and bottom of the scrapers. The top cross-bar is perforated in its center for the passage of the spindle, the orifice being somewhat larger than the diameter of the spindle, or preferably elliptical in shape, so that the scrapers may partake of laterally-oscillating motion, so that if in their revolution the said scrapers be thrown against either side of the freezing-vessel, the resistance thereby created should readily be overcome, to prevent occasional stoppages of the apparatus. The upper cross-bar is surmounted by a pin, P. It is of such height as to penetrate a corresponding cavity in the covering or brace E, the object being to hold fast or arrest the motion of the scraper when the spindle is being revolved. The lower cross-bar O'' is twisted on either side of the spindle-orifice into helical shape, and is slotted transversely, for the purpose of enabling the operator conveniently to separate the spindle from the scraper, and vice versa, as circumstances may require. Wings or dashers R are cast or otherwise secured to the scraper-frame. They are placed to interlock with the beaters or dashers fast on the spindle. By this arrangement I am enabled effectually to mix, beat up, and render homogeneous the mass of cream compound, while formation of ice particles or lumps is entirely obviated. To the bottom of the ice-bucket is fastened a circular rim or flange, S. This I use for the purpose of preventing the freezing-vessel from floating when the ice shall have melted to such extent as to fill its lower cavity with water. Slits m are cut in the flange S, to allow of the horizontal pins T to pass up and through the flange, and thus disengage the vessel therefrom. On the bottom of the cream-holder I use wings V, whose function it is to keep up intimate mixture of the ice and salt and dissolve the salt as it falls to the bottom of the tub. After the cream is sufficiently beaten and frozen and about to assume requisite consistency, the spindle and scraper are removed, to allow the cream to freeze into shape—i.e., with a glazed surface like the inside of the vessel. To do this rapidly and effectively the revolution of the vessel ought to be kept up without the beating and scraping operations being at the same time performed. I effect this by the employment, in lieu of the long spindle, of a short spindle, n, secured to the top of a cap which fits within the flange M of the covering L. The recess q in the cap, corresponding with a projection or lug on the inside of the flange, will cause the freezing-vessel to revolve with the spindle when the latter is rotated. To hold the short spindle in its vertical position while it is rotated, I use a metal strap, W, through the central orifice of which the said spindle passes.

Having thus fully described my improvements in ice-cream freezers, I shall state my claims as follows:

1. In ice-cream freezers of otherwise ordinary construction and operation, the method described of imparting rotary motion to the freezing-vessel while the scrapers are held stationary, by the employment, in combination with a spindle bearing in a socket in the bottom of the freezing-vessel, of a pivot cast to the said vessel and bearing in a socket in the ice-bucket, the whole being arranged to operate substantially in the manner herein set forth.

2. The employment of stirring-blades arranged to the bottom of the cream-holder to mix with the ice particles and dissolve the salt that shall have been carried to the bottom, substantially as herein set forth.

3. In combination with a revolving cream-freezing vessel and stationary scrapers, the use of revolving beaters fast on the spindle, operating in connection with stationary beaters fast on the scrapers, substantially in the manner and purposes set forth.

In testimony whereof I have signed my name to this specification in the presence of two subscribing witnesses.

OSCAR PADDOCK.

Witnesses:
R. R. MEIGS,
G. F. PADDOCK.